United States Patent
Anderson et al.

(10) Patent No.: US 9,763,379 B2
(45) Date of Patent: Sep. 19, 2017

(54) REPLACEABLE WEAR INSERT FOR A FORMING POINT POSITIONED BETWEEN FURROW OPENING DISKS

(71) Applicant: CNH Industrial America LLC, New Holland, PA (US)

(72) Inventors: Brian J. Anderson, Yorkville, IL (US); Travis L. Hartnetiaux, Bourbonnais, IL (US); Johnathon R. Dienst, DeKalb, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/755,945

(22) Filed: Jun. 30, 2015

(65) Prior Publication Data

US 2017/0000002 A1   Jan. 5, 2017

(51) Int. Cl.
*A01C 5/06* (2006.01)
*A01B 49/06* (2006.01)

(52) U.S. Cl.
CPC .............. *A01C 5/064* (2013.01); *A01B 49/06* (2013.01); *A01C 5/062* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,091,486 | A | * 8/1937 | Casmir | A01C 5/064 384/157 |
| 3,507,233 | A | * 4/1970 | Greig | A01C 5/06 111/136 |
| 3,995,699 | A | 12/1976 | Blucher et al. | |
| 4,356,780 | A | * 11/1982 | Bauman | A01C 5/06 111/135 |
| 4,360,068 | A | 11/1982 | Stephenson et al. | |
| 4,596,200 | A | * 6/1986 | Gafford | A01C 7/20 111/136 |
| 4,880,122 | A | * 11/1989 | Martindell | B25H 3/003 206/374 |
| 5,697,308 | A | 12/1997 | Rowlett | |
| 5,850,790 | A | 12/1998 | Salte | |
| 6,032,593 | A | 3/2000 | Wendling et al. | |
| 6,082,276 | A | 7/2000 | Klein et al. | |
| 6,260,632 | B1 | 7/2001 | Bourgault et al. | |
| 6,318,279 | B1 | 11/2001 | Rowlett et al. | |
| 6,408,772 | B1 | 6/2002 | Lempriere | |
| 6,640,731 | B1 | 11/2003 | Rowlett et al. | |

(Continued)

FOREIGN PATENT DOCUMENTS

EP           0140264 A2 * 5/1985 ............... A01C 5/06
WO    2014/117210 A1   8/2014

*Primary Examiner* — Alicia Torres
(74) *Attorney, Agent, or Firm* — Rebecca L. Henkel; Rickard K. DeMille

(57) ABSTRACT

An agricultural seed planting implement has a frame moveable in an up and down direction relative to soil over which the frame traverses. A seed trench opening assembly mounted on the frame includes disks mounted side by side and having a forming point positioned in between. A wearable insert of plastic is slidably but non-rotatably retained in the forming point to abut the disks when they are deflected. The disks are removable to enable simple replacement of the wearable insert.

9 Claims, 5 Drawing Sheets

(56) References Cited

U.S. PATENT DOCUMENTS

| | | |
|---|---|---|
| 6,745,709 B2 | 6/2004 | Rowlett et al. |
| 6,966,270 B2 | 11/2005 | Rowlett et al. |
| 7,131,384 B2 | 11/2006 | Kester |
| 7,568,439 B2 | 8/2009 | Steinlage et al. |
| 7,584,707 B2 | 9/2009 | Sauder et al. |
| 7,685,951 B2 | 3/2010 | Beaujot et al. |
| 7,891,436 B2 | 2/2011 | Cruson |
| 8,104,543 B2 | 1/2012 | Hesla |
| 8,336,233 B1 | 12/2012 | Lombardo et al. |
| 8,516,969 B2 | 8/2013 | Wendte et al. |
| 8,646,395 B2 | 2/2014 | Schilling et al. |
| 8,833,483 B2 | 9/2014 | Knobloch et al. |
| 2002/0189513 A1 | 12/2002 | Beaujot |
| 2004/0159271 A1* | 8/2004 | Beaujot ................ A01C 5/062 111/149 |
| 2014/0083341 A1 | 3/2014 | Arksey et al. |
| 2014/0109809 A1 | 4/2014 | Schilling et al. |
| 2014/0144654 A1 | 5/2014 | Arksey et al. |
| 2014/0158031 A1* | 6/2014 | Hagny ................ A01C 5/06 111/121 |
| 2014/0190382 A1 | 7/2014 | Anderson et al. |

\* cited by examiner

REPLACEABLE WEAR INSERT FOR A FORMING POINT POSITIONED BETWEEN FURROW OPENING DISKS

BACKGROUND OF THE INVENTION

1. Field of the Invention

The present invention generally relates to agricultural seed planting implements and to the furrow opening assemblies thereon.

2. Description of the Related Art

Farmers utilize a wide variety of seed planting implements, including seed drills and planters. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed metering device provides individual seeds at a controlled rate for deposit in the seed trench. Furrow closing components of each row unit close the seed trench in a controlled manner.

One of the first functions in the planting operation is too open and form the seed trench. Typically this is done by utilizing side-by-side disks that are angled to form roughly a V there between and which pierces the soil to begin the trench forming process. A forming point, usually from steel, is mounted between the disks to form and establish the lower boundary of the trench thus formed by the opening disks. In operation, the disks deflect significantly when they are displaced through the soil to open the trench. The disks, in this deflected state, abut one another and can abut the forming point. In time, the wear between the metallic parts makes it necessary to replace the forming point and disks. Such an operation is expensive and complicated since it involves a substantial disassembly of the trench forming apparatus.

What is needed in the art is a simple and effective way to accommodate wear in a trench opening assembly of a seed planter.

SUMMARY OF THE INVENTION

The invention seeks to provide a wearable component of the seed trenching apparatus that is easily replaceable.

In one form, the invention is an agricultural seed planting implement including a frame moveable in an up and down direction relative to soil over which the frame traverses. A seed trench opening assembly is mounted to the frame and includes disks positioned side-by-side and mounted on the frame. A forming point is also mounted on the frame and positioned in between the opening disks to define the bottom of the seed trench made by the opening disks. A wearable insert is slidingly mounted on the forming point and extends laterally from the forming point to abut the opening disks as they are deflected towards one another in forming the seed trench. The disks capture the wearable insert in the forming point.

One advantage of the invention is an inexpensive wear component of a seed trench opening apparatus.

Another advantage of the invention is an easily replaceable wear component of a seed trench opening apparatus.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
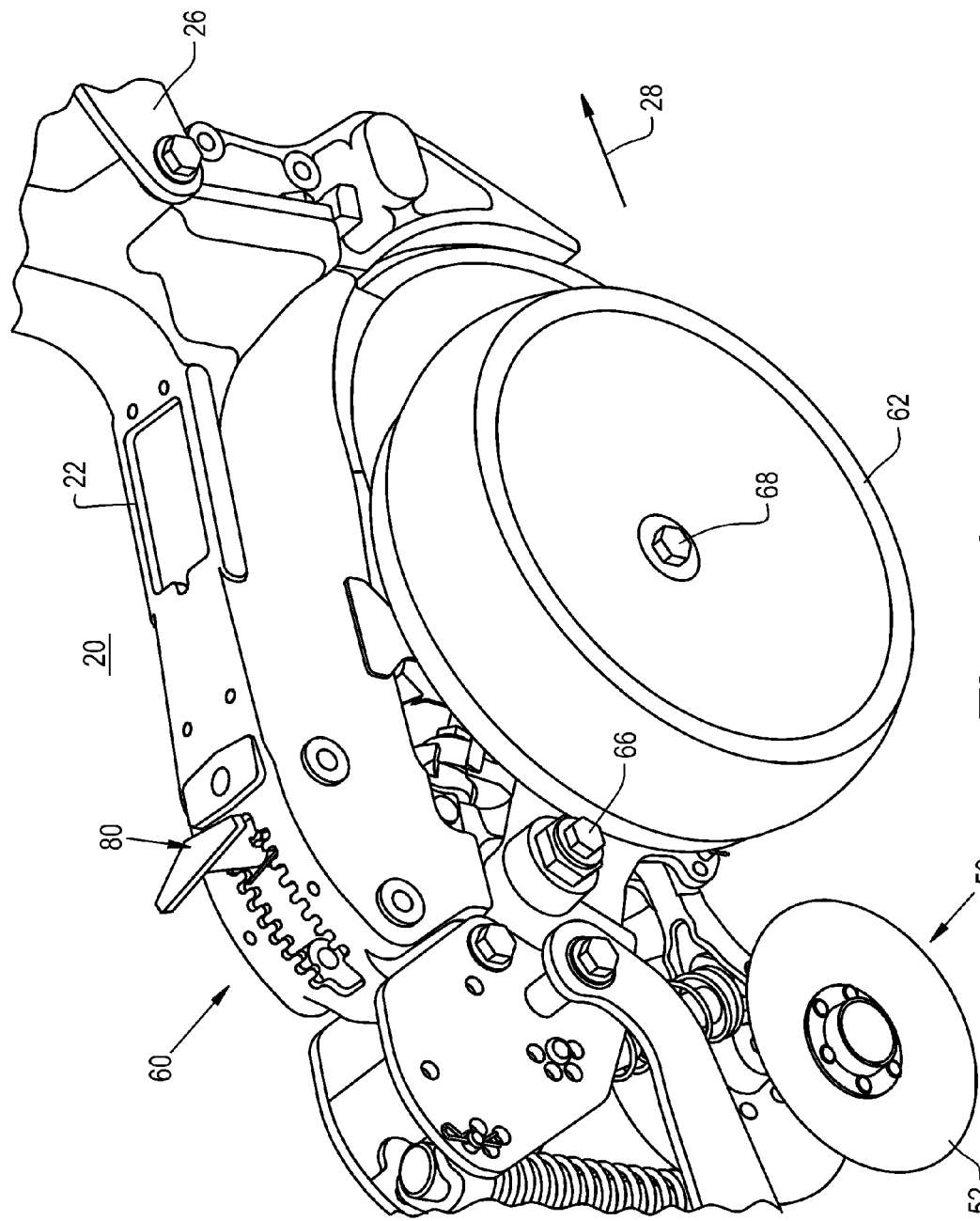
FIG. 1 is a perspective view of a seed planting unit incorporated in a seed planting implement.

Referring now to the drawings more specifically and to FIG. 1 in particular, a seed planting unit 20 is shown. Seed planting unit 20 is part of a seed planting implement having a frame that includes a tow bar assembly, a tow bar and a connection assembly at the longitudinally forward end thereof configured for mating with a corresponding hitch of a tractor or other work vehicle (all of which are not shown) for pulling the seed planting implement through a field. A laterally extending toolbar 18 (shown in dashed lines in FIG. 2) is generally transverse to the tow bar and thereby generally transverse to the direction 28 the implement is towed during planting operations. A plurality of seed planting units (or row units) 20 are connected to toolbar 18 in a side by side relationship, each of the seed planting units (row units) being substantially identical to the others. In the exemplary embodiment shown, a seed planting implement may include sixteen seed planting units 20, only one of which is identified with reference numbers; however, it should be understood that more or fewer seed planting units can be provided on a particular seed planting implement.

Figure 2:
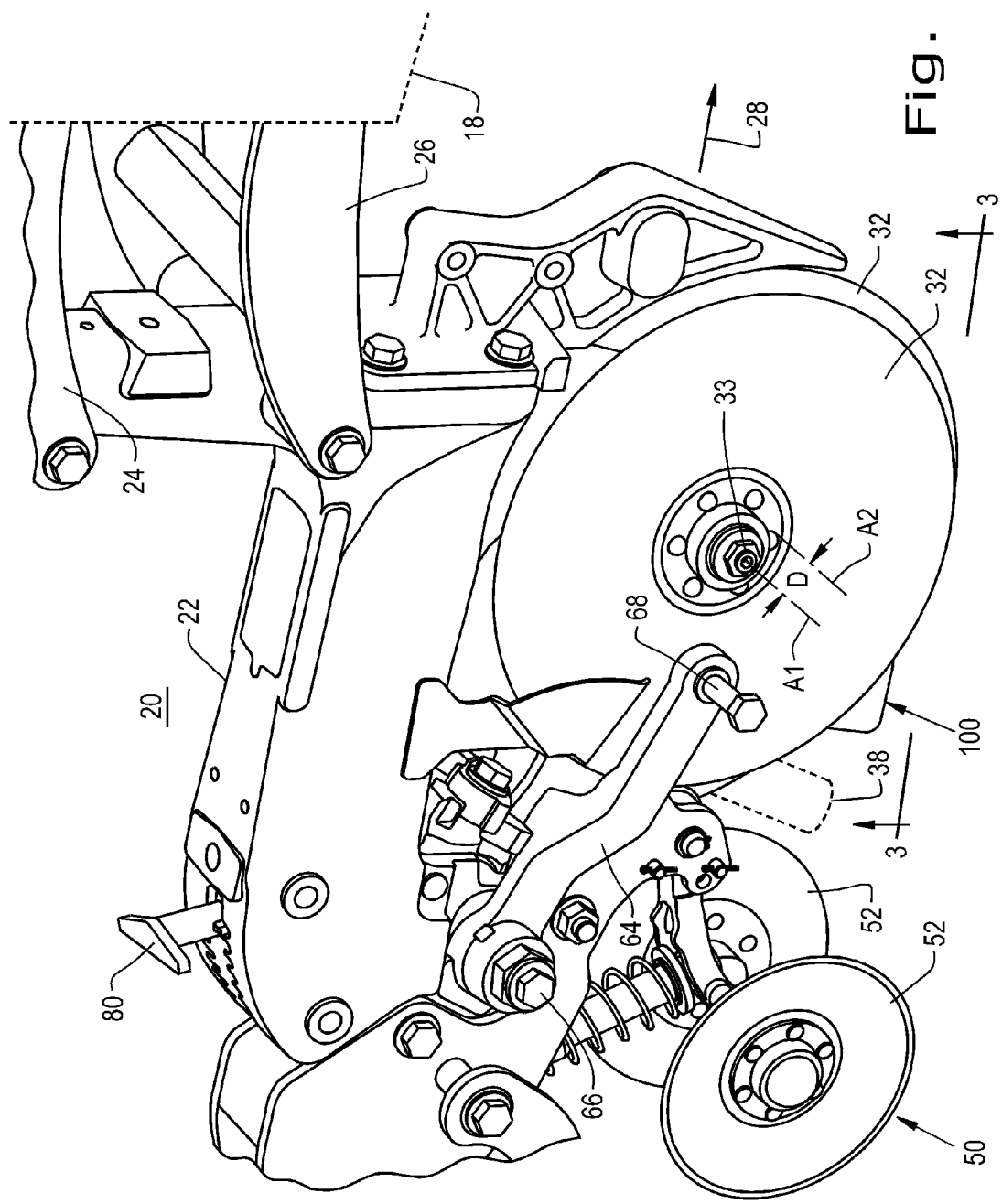
FIG. 2 is another perspective view of the seed planting unit, showing the unit from an angle different from the angle shown in the perspective view of FIG. 2.

Referring now primarily to FIGS. 1 and 2, each seed planting unit 20 includes a frame 22 that is connected to toolbar 18 by upper arms 24 and lower arms 26, each arm 24, 26 being connected to frame 22 and to toolbar 18. Accordingly, each seed planting unit 20 extends rearward from toolbar 18 to plant a row of seeds as the seed planting implement is towed across a field in the direction 28. The individual planting units 20 are spaced along toolbar 18 to provide planted seed rows of a desired spacing. During a planting operation, forward movement of the seed planting implement causes each seed planting unit 20 to form a seed trench, deposit equally spaced seeds in the seed trench and close the seed trench over the deposited seeds.

Each seed planting unit 20 includes a ground penetrating or seed trench opening assembly having a pair of forwardly and downwardly angled opening discs 32 that converge forwardly and downwardly to open a furrow or seed trench as the seed planting implement moves forward. As particularly seen in FIG. 2, the opening disks 32 are mounted on axes A1 and A2, in staggered relation so that their axes are spaced by Dl. Opening disks 32 are removably retained on frame 22 by nuts 33.

A seed metering system receives seeds from a seed hopper and provides individual seeds at a controlled rate to a seed tube 38 (shown in dashed lines) for deposit in the bottom of the seed trench formed. The details of the seed metering system are not shown to enable a clearer understanding of the present invention.

A seed trench closing mechanism 50 (FIG. 1) at the trailing end of each seed planting unit 20 closes the seed trench after the seeds have been deposited in the seed trench. Seed trench closing mechanism 50 includes a pair of pinch wheels 52 (FIG. 2) that operate on opposite sides of the seed trench to move soil back into the seed trench and over the seeds deposited in the bottom of the seed trench. A trailing press wheel (not shown) travels along the top of the closed seed trench and firms the soil replaced in the seed trench.

The depth to which opening discs 32 are allowed to penetrate the ground is controlled by a depth control assembly 60 that includes a pair of gauge wheels 62, gauge wheel arms 64 and a depth adjuster and linkage assembly 80. One of the gauge wheels 62 is provided adjacent each opening disc 32. Each gauge wheel 62 is rotatably mounted on one of the gauge wheel arms 64 by a wheel retention shaft 68, which is particularly illustrated in FIG. 2 where the near side gauge wheel 62 has been removed. The gauge wheel arms 64 are of equal length for production purposes and are pivotally connected at a pivotal attachment 66 to seed planting unit frame 22. Pivoting gauge wheel arm 64 about pivotal attachment 66 to frame 22 changes the relative height position of gauge wheel 62.

Figure 3:
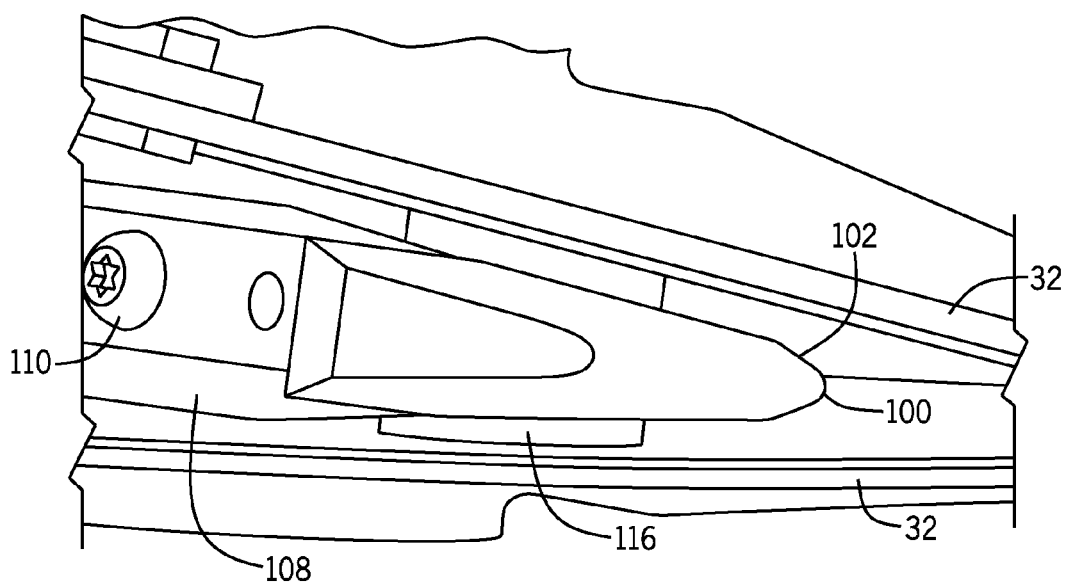
FIG. 3 is a fragmentary view of the seed planting unit illustrated in FIG. 2 taken on lines 2-2 and showing a forming point.

A forming point assembly 100 is positioned between opening disks 32 and defines the contour of the bottom of the trench formed by the seed planting unit 20. As shown in FIGS. 2 and 3, the forming point assembly 100 is positioned between disks 32. The disks 32 deflect during operation and can abut and rub on the forming point assembly, causing wear since the interaction is steel to steel. In accordance with the present invention, a wearable insert is positioned between the forming point assembly 100 and the disks 32, as described below.

Figure 4:
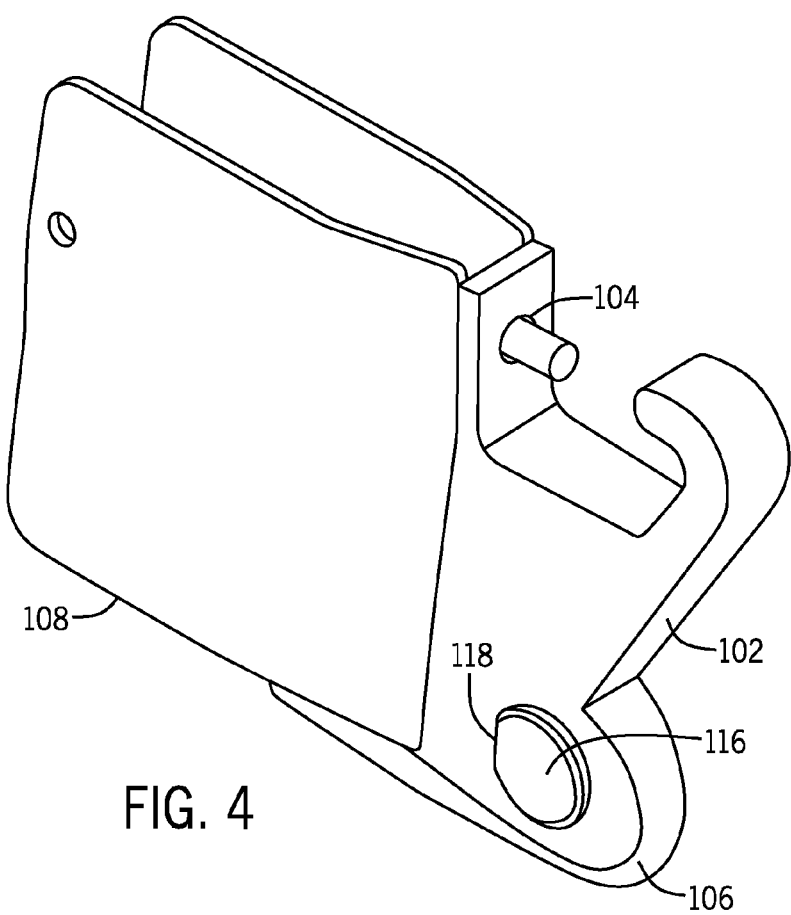
FIG. 4 is a perspective view of the forming point illustrated out of the seed planting unit.

Referring specifically to FIGS. 3 and 4, the forming point assembly 100 has a base 102 that has an opening 104 providing a mounting point to frame 22. A wall section 108 is usually formed from sheet metal and has a curved leading edge connected to the downstream side of base 102 and which gives width to the trench so formed. Base 102 has a leading edge 106 which is wedge shape when viewed in the plan view of FIG. 3 and circular in shape when viewed from the side.

Figure 6:
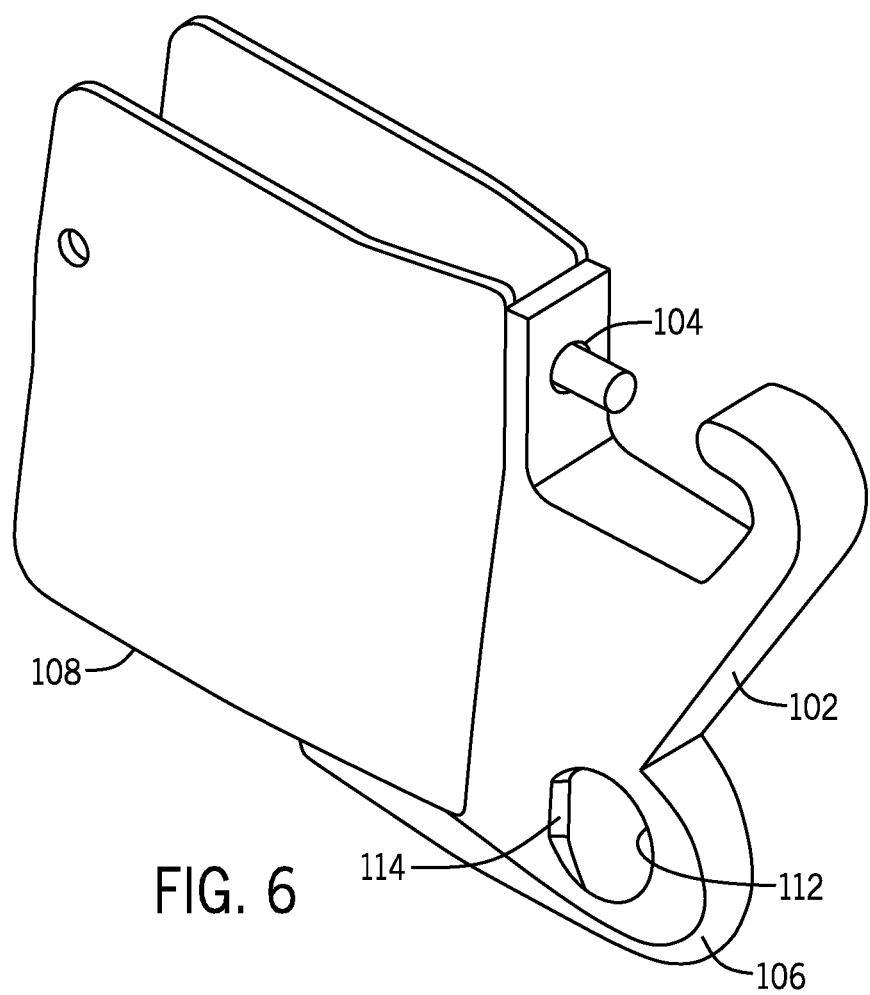
FIG. 6 is a perspective view similar to FIG. 4, but showing the wearable insert removed to show the circular opening having a flat side.

Base 102 has a circular opening 112 with a flat section 114 interposed in its periphery, as illustrated in FIG. 6. A wearable insert 116 having a cylindrical shape and a flat 118 fits into opening 112, as shown in FIG. 4, and it is slidable laterally relative to base 102. As shown particularly in FIG. 3, the insert 116 extends beyond the base 102 and into abutment with the inside of opposed disks 32. Insert 116 is slidable laterally, but is not rotatable.

In operation of the seeding unit 20, the disks 32 deflect inward as they form the desired trench. Instead of abutting the forming point assembly 100 the opening disks 32 abut the wear insert 116, which acts as a sacrificial element protecting the remaining components. Because the insert 116 is movable laterally it balances between the two disks 32. When the insert 116 reaches its wear limit it may be easily removed by disconnecting one or both of the disks 32 by removing nuts 33. At that point, the wear insert 116 may be simply replaced by pushing it out of the hole 112 and inserting a new wear insert 116. The wear insert can be formed from any wearable plastic material such as UHMW plastic and nylon thus avoiding the replacement of more expensive steel parts in the disks 32 and forming point assembly 100.

Figure 5:
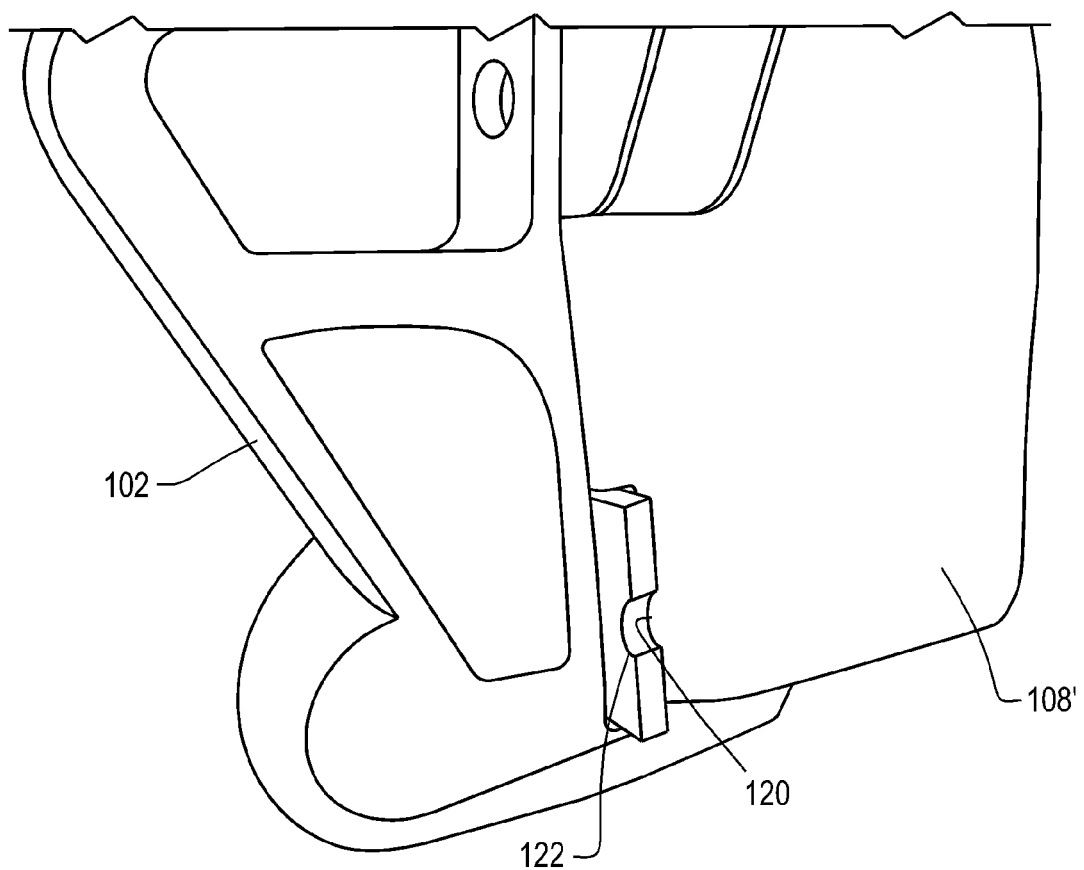
FIG. 5 is a perspective view of an alternative embodiment of the forming point illustrated out of the seed planting unit.

While the wear insert 116 in FIGS. 2 and 3 is shown as cylindrical with a flat, it may be in another form as illustrated in FIG. 5. In that figure, the base 102 has a modified wall section 108' secured to it. A rectangular opening 120 is provided in the forward edge of the wall section 108' and cooperates with the base 102 to form a rectangular through opening 120 which receives a rectangular shaped wear insert 122. In this case, the wear insert 122 may slide laterally but does not have the possibility to rotate. The configuration shown in FIG. 5 has the same benefits as the wear insert 116 of FIGS. 2 and 3.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural seed planting implement, comprising:
   a frame moveable in an up and down direction relative to soil area over which the frame traverses;
   a seed trench opening assembly mounted to said frame and including disks positioned in side-by-side relationship;
   a forming point positioned in between said opening disks to define the bottom of the seed trench made by said opening disks, the forming point including:
     a base having a tapered leading edge relative to a direction of movement over which the seed planting implement traverses, the base including a circular shape when the base is viewed from a side thereof, and
     a curved wall section mounted to a downstream side of the base, wherein the leading edge of the wall section has a rectangular notch positioned therein at a junction between the leading edge of the wall section and the base forming a through hole with a rectangular cross section; and
   a wearable insert slidingly mounted on said forming point and extending laterally from said forming point to abut said opening disks as they are deflected toward one another in forming the seed trench, said opening disks retaining said wearable insert in said forming point, said wearable insert being rectangular in cross section and received in said through hole.

2. The agricultural seed planting implement as claimed in claim 1, wherein at least one of said opening disks is removable for allowing removal of said wearable insert.

3. The agricultural seed planting implement as claimed in claim 1, wherein said insert is non-rotatable relative to said forming point.

4. The agricultural seed planting implement as claimed in claim 1, wherein said insert is rectangular and the forming point has a rectangular opening for receiving said insert.

5. The agricultural seed planting implement as claimed in claim 1, wherein said wearable insert is plastic.

6. The agricultural seed planting implement as claimed in claim 1, wherein an axis of said disks are offset relative to one another in the direction over which the seed planting implement traverses.

7. The agricultural seed planting implement as claimed in claim 1, further comprising gauge wheels mounted on said frame adjacent said opening disks and adjustable relative to said frame for establishing a depth of the seed trench.

8. The agricultural seed planting implement as claimed in claim 7, further comprising a seed tube for receiving seeds to be planted in the trench formed by said seed trench opening assembly and said forming point.

9. The agricultural seed planting implement as claimed in claim 1, further comprising closing disks positioned behind said opening disks and gauge wheels for closing the trench thus formed.

* * * * *